US011080275B2

(12) United States Patent
Tabb et al.

(10) Patent No.: US 11,080,275 B2
(45) Date of Patent: Aug. 3, 2021

(54) JOIN PATTERN AGNOSTIC AGGREGATE COMPUTATION IN DATABASE QUERY OPERATIONS

(71) Applicant: Google LLC, Mountain View, CA (US)

(72) Inventors: Lloyd Tabb, Santa Cruz, CA (US); Steven Talbot, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 276 days.

(21) Appl. No.: 16/403,492

(22) Filed: May 3, 2019

(65) Prior Publication Data

US 2020/0349159 A1 Nov. 5, 2020

(51) Int. Cl.
*G06F 16/2453* (2019.01)
*G06F 16/2455* (2019.01)

(52) U.S. Cl.
CPC .. *G06F 16/24537* (2019.01); *G06F 16/24556* (2019.01)

(58) Field of Classification Search
None
See application file for complete search history.

(56) References Cited

U.S. PATENT DOCUMENTS

| | | | | |
|---|---|---|---|---|
| 5,991,754 | A * | 11/1999 | Raitto | G06F 16/24539 |
| 8,359,325 | B1 * | 1/2013 | Gui | G06F 16/986 707/760 |
| 9,292,571 | B1 * | 3/2016 | Kiryakov | G06F 16/284 |
| 10,169,442 | B1 * | 1/2019 | Davidson | G06F 9/3895 |
| 2005/0060292 | A1 * | 3/2005 | Day | G06F 16/24549 |
| 2006/0116989 | A1 * | 6/2006 | Bellamkonda | G06F 16/24556 |
| 2006/0195437 | A1 * | 8/2006 | Dietel | G06F 16/24539 |
| 2007/0061287 | A1 * | 3/2007 | Le | G06F 16/24539 |
| 2011/0246460 | A1 * | 10/2011 | Hsieh | G06Q 30/02 707/736 |
| 2012/0215810 | A1 * | 8/2012 | Evans | G06F 16/24556 707/771 |
| 2014/0156709 | A1 * | 6/2014 | Rao | G06F 16/282 707/803 |
| 2014/0279944 | A1 * | 9/2014 | Ghandeharizadeh | G06F 16/2365 707/690 |
| 2019/0303405 | A1 * | 10/2019 | Kothari | G06F 16/24544 |

* cited by examiner

*Primary Examiner* — Christopher J Raab
(74) *Attorney, Agent, or Firm* — Honigman LLP; Brett A. Krueger

(57) ABSTRACT

A method of computing a join pattern agnostic aggregate function includes loading source code and parsing the source code to identify different database query operations. In response to the identification of an aggregate function in one of the different database query operations in which records in multiple tables are joined together in a table join, a multiplicity of primary keys are retrieved, each corresponding to a different one of the multiple tables and also an object of one of the tables referenced by the identified aggregate function. An existence of a fan out condition associated with the table join is then computed. On condition that an existence of the fan out condition is not computed a non-fan out sensitive implementation of the aggregate function is invoked with respect to the object. But, otherwise, a different, fan-out sensitive implementation of the aggregate function is invoked with respect to the object.

15 Claims, 2 Drawing Sheets

JOIN PATTERN AGNOSTIC AGGREGATE COMPUTATION IN DATABASE QUERY OPERATIONS

BACKGROUND OF THE INVENTION

Field of the Invention

The present invention relates to the field of database query operations and more particularly to the execution of an aggregate function upon data in one or more tables of a database.

Description of the Related Art

In data science, a database query can be either a select query or an action query. A select query is a data retrieval query, while an action query asks for additional operations on the data, such as insertion, updating or deletion. Generally, the select query operates on a field of a table. In this regard, a table is the fundamental component of a database. In a database, each table includes zero or more rows and one or more columns. A relational database, as a species of a general digital database, includes a set of formally described tables from which data can be accessed or reassembled in many different ways without having to reorganize the database tables. To that end, in a relational database table, each row may be uniquely identified by a primary key that may include one or more sets of column values. In most scenarios, the primary key is a single column of a corresponding table.

The standard user and application programming interface (API) of a relational database is the Structured Query Language (SQL). SQL statements are used both for interactive queries for information from a relational database and for gathering data for reports. In SQL, the equivalent of the select query is the SELECT query statement with a WHERE clause operative to retrieve records from a relation, limiting the results to only those that meet a specific criterion. Notably, the select query in producing a result set of records, may be followed with a computational function, namely an aggregate function operating upon the result set. A typical aggregate function includes the SQL SUM( ) operation which sums numeric values of a specified column of the result set, or the SQL COUNT( ) operation which provides a count of the number of records in the result set.

When performed upon a single table in a database, an aggregate function requires little management. Simply selecting the suitable column of the table for aggregation and specifying the precise aggregate function is sufficient to receive an accurate result. However, so much is not true across a fan out of multiple tables. In this regard, SQL provides for the notion of a table join. A table join, implemented through the SQL operator JOIN, acts to join together the records of two different tables to produce a composite table. Different variants of the join operation include an inner join, a left join, a right join and a full join. As well, the product of a join operation itself may be the subject of a further join operation in respect to a different table. Depending upon the nature of the join operation, the typical result set may include a same number of rows as each contributing table to the join operation. But, on occasion, the opposite may result producing a "fan out" condition.

In a fan out condition, the result set from a join operation includes more rows than each of the contributor tables to the join operation--namely a one-to-many relationship. As such, aggregate functions, such as a count operation or a sum operation, can product inaccurate results owing to the additional rows of the result set of the join operation. To combat the adverse consequences of the fan out condition, one known strategy includes directing a count operation before and after a table join to ensure that an undesirable fan out has not occurred. More sophisticated approaches implement the DISTINCT operator of SQL while relying upon a priori knowledge of the pattern of join operation producing the result set and whether or not the result set reflects a one-to-one relationship, a many-to-many relationship, or the problematic one-to-many relationship. But, as can be seen, absent the a priori knowledge of the pattern of the join operation, it is difficult to guarantee the accuracy of the result of an aggregate function performed upon the result set of a join operation.

BRIEF SUMMARY OF THE INVENTION

Embodiments of the present invention address deficiencies of the art in respect to aggregate computation in database query operations and provide a novel and non-obvious method, system and computer program product for join pattern agnostic aggregate function computation in database query operations. In an embodiment of the invention, the method includes first loading a source code document into memory of a computer, for example, a markup language abstraction of SQL. Then the source code document is parsed to identify different database query operations. Thereafter, in response to the identification of an aggregate function in one of the different database query operations in which records in multiple tables are joined together in a table join, the method retrieves from memory of the computer a multiplicity of primary keys, each corresponding to a different one of the multiple tables and also an object of one of the tables referenced by the identified aggregate function. The method further computes an existence of a fan out condition associated with the table join. Finally, on the condition that the fan out condition is not computed, the method invokes a non-fan out sensitive implementation of the aggregate function with respect to the object. But, otherwise, on the condition that the fan out condition is computed, the method invokes a different, fan-out sensitive implementation of the aggregate function with respect to the object.

In one aspect of the embodiment, the non-fan out sensitive implementation of the aggregate function is a SQL operation, for instance SUM( ), AVG( ), STDDEV( ) or COUNT( ). As such, the different, fan out sensitive implementation of the aggregate function extracts unique values for the object from each of the multiple tables using a corresponding one of the primary keys and then performs the non-fan out sensitive implementation of the aggregate function upon the extracted unique values. In another aspect of the embodiment, the existence of the fan out condition is computed to exist when the underlying table has not been joined by a corresponding one of the primary keys. Likewise, an absence of the fan out condition is computed (meaning that the fan out condition does not exist), when the underlying table has been joined by the corresponding one of the primary keys.

6. In another embodiment of the invention, a database query data processing system is configured for join pattern agnostic aggregate function computation in database query operations. The system includes a host computing system that has one or more computers, each with memory and at least one processor. The system also includes a relational database management system executing in the memory of the computer and acting upon a multiplicity of different tables in one or more databases stored in fixed storage coupled to the host computing system. The system yet further includes a join pattern agnostic aggregate function computation module that includes computer program instructions executing in the memory of the host computing system.

In this regard, the program instructions are enabled during execution in the memory of the computer to load a source code document into the memory, parse the source code document to identify different database query operations and to respond to identifying an aggregate function in one of the different database query operations in which records in multiple tables are joined together in a table join. The response includes the retrieval from memory of the computer of a multiplicity of primary keys, each corresponding to a different one of the multiple tables and also an object of one of the tables referenced by the identified aggregate function. The response further includes the computation of an existence of a fan out condition associated with the table join. Finally, the response includes, on the condition that the fan out condition is not computed, invoking a non-fan out sensitive implementation of the aggregate function with respect to the object, but otherwise on condition that the fan out condition is computed, invoking a different, fan-out sensitive implementation of the aggregate function with respect to the object.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for join pattern agnostic aggregate function computation in database query operations. In accordance with an embodiment of the invention, a source code document is received in memory of a computer and parsed in order to identify a multiplicity of database query operations. An aggregate function associated with a table join is detected amongst the database query operations and, in response to the detection of the aggregate function associated with the table join, a table subject to the table join is identified along with its primary key. Based upon the underlying table, a fan out condition is determined to exist or not to exist based upon whether or not the underlying table has been joined by the primary key. In the event that a fan out condition is determined not to exist, a standard, non-fan out sensitive implementation of the aggregate function is invoked, but otherwise, the primary key is used to compute a fan out sensitive form of the aggregate function. In this way, a correct result of the aggregate function is guaranteed without knowing a priori a join pattern pre-conditioning the aggregate function.

Figure 1:
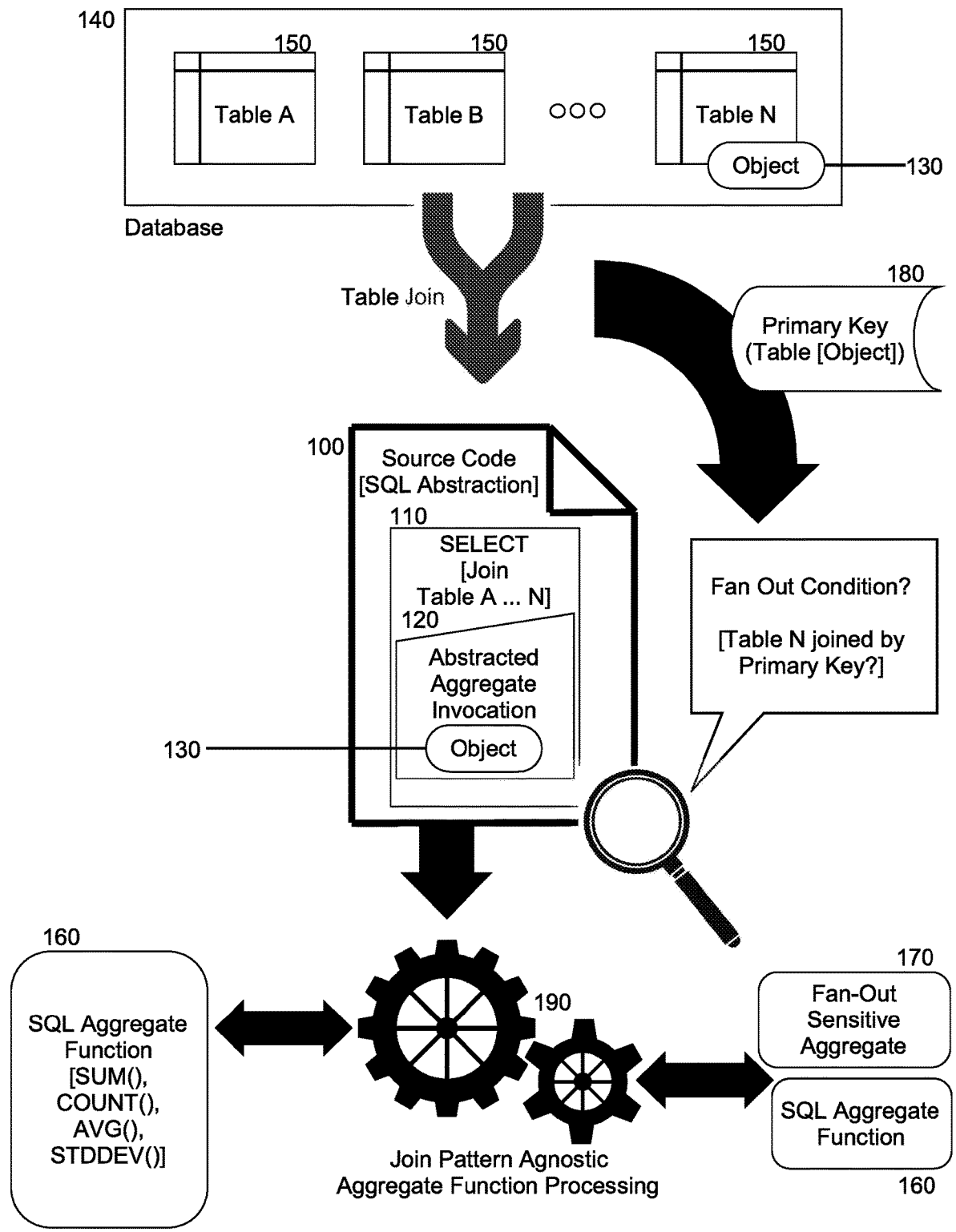
FIG. 1 is pictorial illustration of a process for join pattern agnostic aggregate function computation in database query operations.

In further illustration, FIG. 1 pictorially shows a process for join pattern agnostic aggregate function computation in database query operations. As shown in FIG. 1, join pattern agnostic aggregate function processing logic 190 processes source code 100 embodying an abstraction of SQL and located there within, an abstracted form of an invocation of an abstracted aggregate function 120 of a SQL aggregate function 160 acting upon an object 130 of one of one or more tables 150 of a database 140. The abstracted aggregate function 120 may be included in the source code 100 in connection with a table join operation joining one or more of the tables 150 including an underlying one of the tables 150 including the object 130.

As such, the join pattern agnostic aggregate function processing logic 190 computes whether or not the table join of the operation produces a fan out condition. For instance, the join pattern agnostic aggregate function processing logic 190 identifies the underlying one of the tables 150 for the object 130 of the abstracted aggregate function 120 and determines whether or not the underlying one of the tables 150 has been joined in the table join by a primary key 180 corresponding to the underlying one of the tables 150. More specifically, the nature of each join in the query is examined so as to categorize the join as fanning out the query or not based on whether a unique key is detected on one side of the join. Whichever side of the join has a unique key is considered one side. However, whenever both sides of the join each have unique keys, it may be concluded that a "one-to-one" join exists and no fanout condition is found.

Yet, if a unique key cannot be detected on one side of the join or the other side of the join, the join cannot be categorized readily as no fan out condition and the join is assumed to have produced a fan out condition--even though the possibility remains that no fan out condition exists. If so, the join is marked as fan out and after each join has been marked as fanning out on one side or another, the join tree for the join is walked to detect which tables are not fanned out globally within the query. Only tables that never appear on one side of a "many-to-one" or a "one-to-many" are determined not to be fanned out. If so, no fan-out condition is computed. Otherwise, the join pattern agnostic aggregate function processing logic 190 computes a fan-out condition without regard to the underlying join pattern of the table join.

On the condition that the join pattern agnostic aggregate function processing logic 190 does not compute a fan out condition, the join pattern agnostic aggregate function processing logic 190 simply invokes an actual SQL aggregate function 160 for the abstracted aggregate function 120 upon the object 130. But, on the condition that the join pattern agnostic aggregate function processing logic 190 computes a fan out condition, the join pattern agnostic aggregate function processing logic 190 pre-processes the object 130 in a fan-out sensitive aggregate function 170 prior to invoking the SQL aggregate function 160 by first extracting from the joined ones of the tables 150 into a resultant record set, records corresponding to unique values for the object 130 according to the primary key 180. Thereafter, the fan-out sensitive aggregate function 170 invoke the SQL aggregate function 160 on the resultant record set.

Figure 2:
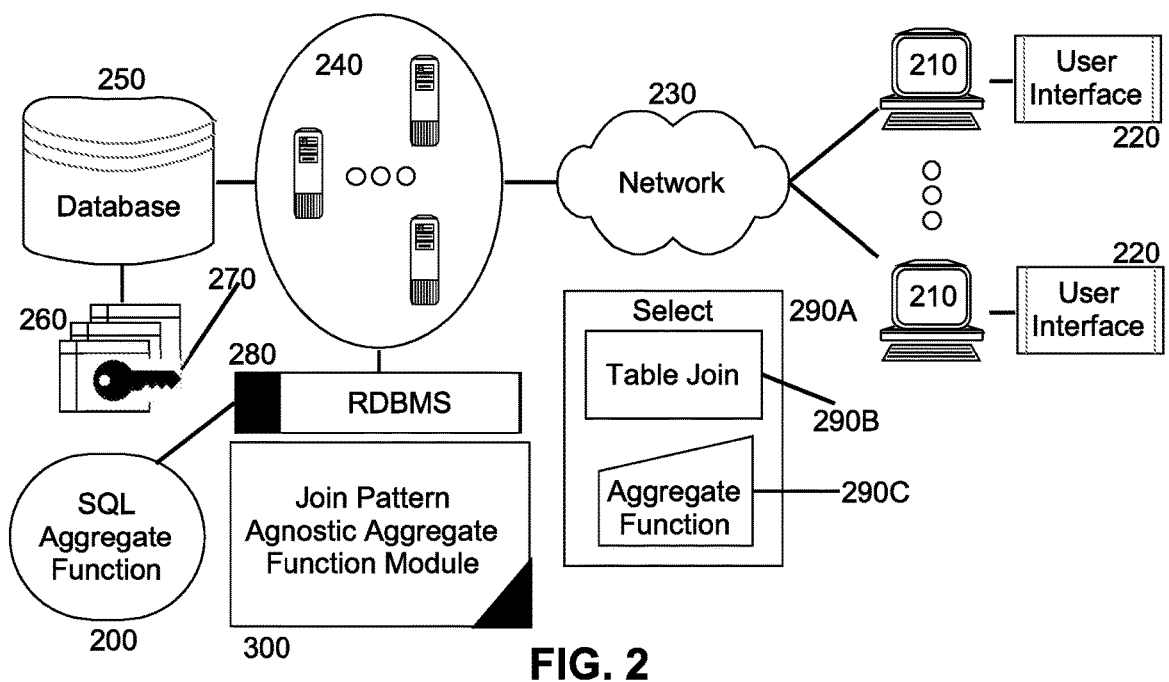
FIG. 2 is a schematic illustration of a database query data processing system configured for join pattern agnostic aggregate function computation in database query operations; and, FIG. 3 is a flow chart illustrating a process for join pattern agnostic aggregate function computation in database query operations.

The process described in connection with FIG. 1 may be implemented within a database query data processing system. In further illustration, FIG. 2 schematically shows a database query data processing system configured for join pattern agnostic aggregate function computation in database query operations. The system includes a host computing system 240 that includes one or more computers, each with memory and at least one processor. The host computing system 240 supports the operation of a relational database management system (RDBMS) 280 managing access to records in different tables 260 of one or more databases 250, each record including a primary key 270. The host computing system 240 is communicatively coupled over computer communications network 230 to different client computing devices 210 providing respective user interfaces 220 for invoking different database query operations in the RDBMS 280 upon the tables 260 of the database(s) 250, including one or more SQL aggregate functions 200 such as SUM( ), COUNT( ), AVG( ) and STDDEV( ).

Notably, the system includes a join pattern agnostic aggregate function module 300. The module 300 includes computer program instructions enabled upon execution in the memory of the host computing system 240 to parse a source code document 290A of abstracted SQL database query statements in order to identify therein an abstracted aggregate function 290C for a corresponding one of the actual SQL aggregate functions 200, for an object in one of the tables 260 included as part of a table join 290B. In response to such identification, the program instructions of the module 300 are enabled to computer whether or not a fan out condition exists. As one example, this computation may occur by identifying an underlying one of the tables 260 joined by the table join 260 for the object that is the subject of the abstracted aggregate function 290C, and to determine whether or not the underlying table had been joined according to its corresponding one of the keys 270. If not, a fan out condition is computed.

The program instructions of the module 300 are even yet further enabled, upon computing a fan out condition, to invoke a fan out sensitive implementation of the aggregate function 290C with respect to the object. The fan out sensitive implementation first extracts from the joined ones of the tables 260 the records with unique values of the object before invoking the corresponding one of the actual SQL aggregate functions on the extracted records. But, otherwise on the condition that the fan out condition is not computed, the corresponding one of the actual SQL aggregate functions may be invoked directly upon the object of the underlying one of the tables.

Figure 3:
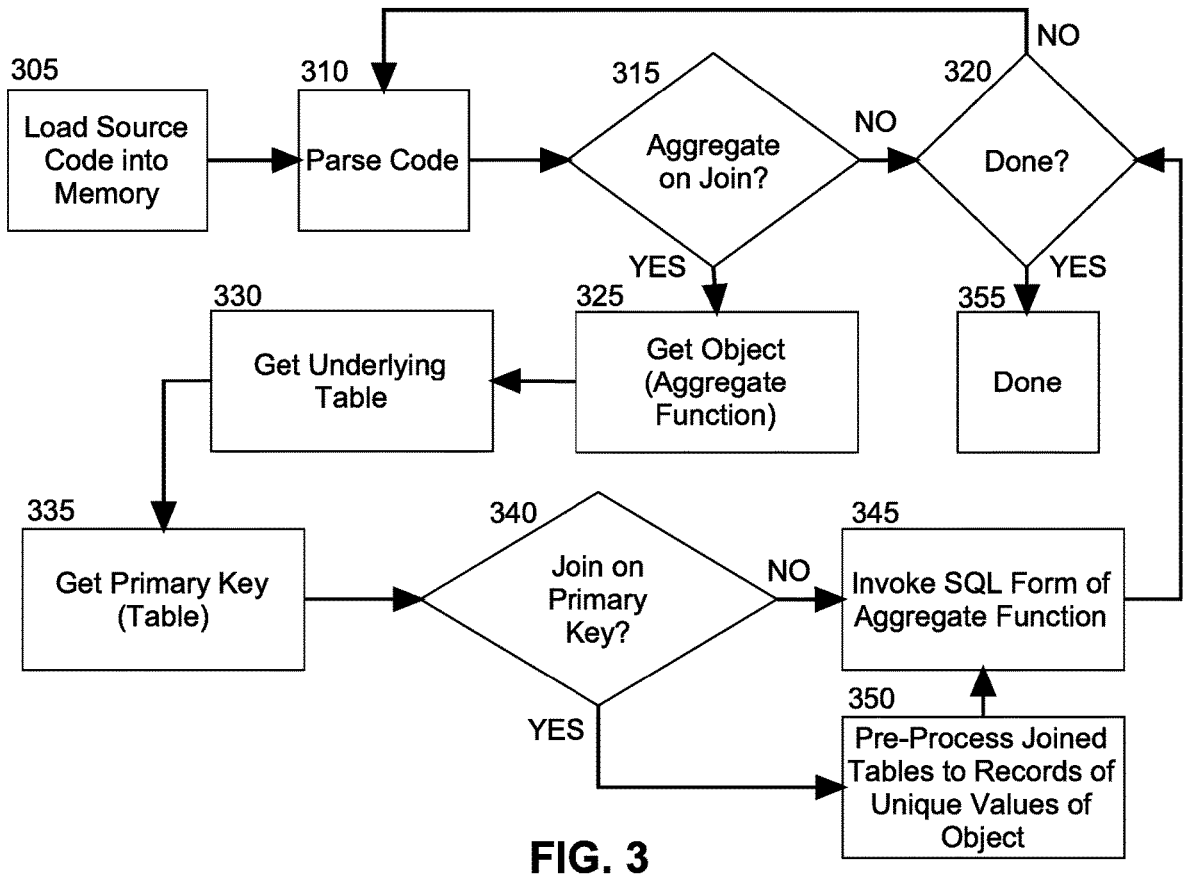

In even yet further illustration of the operation of the join pattern agnostic aggregate function module 300, FIG. 3 is a flow chart illustrating a process for join pattern agnostic aggregate function computation in database query operations. Beginning in block 305, source code representative of an abstracted form of different SQL database query operations is loaded into memory of a computer and in block 310, the source code is parsed to identify different abstracted forms of one or more SQL aggregate functions. In decision block 315, it is determined whether or not a located abstracted form of a SQL aggregate function acts upon an object of a table subject to a table join operation. If not, in decision block 320, so long as additional query operations remain to be processed in the source code, the process returns to block 310. Otherwise, the process ends in block 355.

In decision block 315, if it is determined that a located abstracted form of a SQL aggregate function does act upon an object of a table subject to a table join operation, in block 325, the object upon which the abstracted form of the SQL aggregate function acts is determined and in block 330, an underlying table for the object is identified. In block 335, a primary key for the underlying table is retrieved and in decision block 340, it is determined whether or not the underlying table had been joined in the table join operation utilizing the retrieved primary key. If so, in block 345 the SQL form of the abstracted aggregate function is invoked upon the object. But, in the event it is determined that the underlying table had been joined in the table join operation without utilizing the primary key, in block 350 a fan out sensitive implementation of the SQL form of the abstracted aggregate function is invoked by first pre-processing the joined tables to records of unique values of the objects and then, in block 345 the SQL form of the abstracted aggregate function is invoked on the records of the pre-processed tables. In this way, the SQL form of the abstracted aggregate function can be invoked without regard to a priori knowledge of the join pattern of the table join indicative of a fan out condition.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of computing a join pattern agnostic aggregate function comprising:
   loading a source code document into memory of a computer;
   parsing the source code document to identify different database query operations; and,
   responsive to identifying an aggregate function in one of the different database query operations in which records in multiple tables are joined together in a table join, performing:
      retrieving from memory of the computer a multiplicity of primary keys, each corresponding to a different one of the multiple tables and also an object of one of the tables referenced by the identified aggregate function;
      computing an existence of a fan out condition associated with the table join; and,
      on condition that the fan out condition is not computed, invoking a non-fan out sensitive implementation of the aggregate function with respect to the object, but otherwise on condition that the fan out condition is computed, invoking a different, fan-out sensitive implementation of the aggregate function with respect to the object.

2. The method of claim 1, wherein the non-fan out sensitive implementation of the aggregate function is a structured query language (SQL) operation, and wherein the different, fan out sensitive implementation of the aggregate function extracts unique values for the object from each of the multiple tables using a corresponding one of the primary keys and then performs the non-fan out sensitive implementation of the aggregate function upon the extracted unique values.

3. The method of claim 2, wherein the SQL operation is an SQL operation selected from the group consisting of SUM( ), AVG( ), STDDEV( ) and COUNT( ).

4. The method of claim 2, wherein the source code is a markup language abstraction of SQL.

5. The method of claim 1, wherein the existence of the fan out condition is computed in consequence of the underlying table having been not been joined by a corresponding one of the primary keys and an absence of the fan out condition is computed in consequence of the underlying table having been joined by the corresponding one of the primary keys.

6. A database query data processing system configured for join pattern agnostic aggregate function computation in database query operations, the system comprising:
   a host computing system comprising one or more computers, each with memory and at least one processor;
   a relational database management system executing in the memory of the computer and acting upon a multiplicity of different tables in one or more databases stored in fixed storage coupled to the host computing system; and,
   a join pattern agnostic aggregate function computation module comprising computer program instructions executing in the memory of the host computing system, the program instructions performing:
      loading a source code document into the memory;
      parsing the source code document to identify different database query operations; and, responsive to identifying an aggregate function in one of the different database query operations in which records in multiple tables are joined together in a table join, performing:
retrieving from memory of the computer a multiplicity of primary keys, each corresponding to a different one of the multiple tables and also an object of one of the tables referenced by the identified aggregate function;
computing an existence of a fan out condition associated with the table join; and,
on condition that the fan out condition is not computed, invoking a non-fan out sensitive implementation of the aggregate function with respect to the object, but otherwise on condition that the fan out condition is computed, invoking a different, fan-out sensitive implementation of the aggregate function with respect to the object.

7. The system of claim 6, wherein the non-fan out sensitive implementation of the aggregate function is a structured query language (SQL) operation, and wherein the different, fan out sensitive implementation of the aggregate function extracts unique values for the object from each of the multiple tables using a corresponding one of the primary keys and then performs the non-fan out sensitive implementation of the aggregate function upon the extracted unique values.

8. The system of claim 7, wherein the SQL operation is an SQL operation selected from the group consisting of SUM( ), AVG( ), STDDEV( ) and COUNT( ).

9. The method of claim 7, wherein the source code is a markup language abstraction of SQL.

10. The system of claim 6, wherein the existence of the fan out condition is computed in consequence of the underlying table having been not been joined by a corresponding one of the primary keys and an absence of the fan out condition is computed in consequence of the underlying table having been joined by the corresponding one of the primary keys.

11. A computer program product for computing a join pattern agnostic aggregate function, the computer program product including a computer readable storage medium having program instructions embodied therewith, the program instructions executable by a device to cause the device to perform a method including:

loading a source code document into memory of a computer;
parsing the source code document to identify different database query operations; and,
responsive to identifying an aggregate function in one of the different database query operations in which records in multiple tables are joined together in a table join, performing:
retrieving from memory of the computer a multiplicity of primary keys, each corresponding to a different one of the multiple tables and also an object of one of the tables referenced by the identified aggregate function;
computing an existence of a fan out condition associated with the table join; and,
on condition that the fan out condition is not computed, invoking a non-fan out sensitive implementation of the aggregate function with respect to the object, but otherwise on condition that the fan out condition is computed, invoking a different, fan-out sensitive implementation of the aggregate function with respect to the object.

12. The computer program product of claim 11, wherein the non-fan out sensitive implementation of the aggregate function is a structured query language (SQL) operation, and wherein the different, fan out sensitive implementation of the aggregate function extracts unique values for the object from each of the multiple tables using a corresponding one of the primary keys and then performs the non-fan out sensitive implementation of the aggregate function upon the extracted unique values.

13. The computer program product of claim 12, wherein the SQL operation is an SQL operation selected from the group consisting of SUM( ), AVG( ), STDDEV( ) and COUNT( ).

14. The computer program product of claim 12, wherein the source code is a markup language abstraction of SQL.

15. The computer program product of claim 11, wherein the existence of the fan out condition is computed in consequence of the underlying table having been not been joined by a corresponding one of the primary keys and an absence of the fan out condition is computed in consequence of the underlying table having been joined by the corresponding one of the primary keys.

* * * * *